United States Patent
Choi

(10) Patent No.: US 8,446,410 B2
(45) Date of Patent: May 21, 2013

(54) APPARATUS FOR GENERATING VOLUMETRIC IMAGE AND MATCHING COLOR TEXTURED EXTERNAL SURFACE

(75) Inventor: Woncheol Choi, San Jose, CA (US)

(73) Assignee: Anatomage Inc., San Jose, CA (US)

( * ) Notice: Subject to any disclaimer, the term of this patent is extended or adjusted under 35 U.S.C. 154(b) by 430 days.

(21) Appl. No.: 11/465,021

(22) Filed: Aug. 16, 2006

(65) Prior Publication Data

US 2007/0262983 A1 Nov. 15, 2007

Related U.S. Application Data

(60) Provisional application No. 60/799,388, filed on May 11, 2006.

(51) Int. Cl.
*G06T 15/00* (2011.01)

(52) U.S. Cl.
USPC ........... 345/424; 345/582; 600/411; 600/427; 382/131; 382/154

(58) Field of Classification Search
USPC .......................................................... 345/630
See application file for complete search history.

(56) References Cited

U.S. PATENT DOCUMENTS

| | | | | |
|---|---|---|---|---|
| 4,669,812 A * | 6/1987 | Hoebing | ............................ | 359/9 |
| 5,462,068 A * | 10/1995 | Rijke et al. | ..................... | 128/881 |
| 5,502,384 A * | 3/1996 | Nakaya et al. | ................. | 324/309 |
| 5,588,428 A * | 12/1996 | Smith et al. | .................... | 600/425 |
| 5,696,892 A * | 12/1997 | Redmann et al. | ............. | 345/582 |
| 5,720,291 A * | 2/1998 | Schwartz | ....................... | 600/456 |
| 6,002,738 A * | 12/1999 | Cabral et al. | ....................... | 378/4 |
| 6,072,496 A * | 6/2000 | Guenter et al. | ............... | 345/419 |
| 6,081,739 A * | 6/2000 | Lemchen | ....................... | 600/407 |
| 6,181,348 B1 * | 1/2001 | Geiger | ........................... | 345/583 |
| 6,208,347 B1 * | 3/2001 | Migdal et al. | ................. | 345/419 |
| 6,492,990 B1 * | 12/2002 | Peleg et al. | .................... | 345/473 |
| 6,549,200 B1 * | 4/2003 | Mortlock et al. | ............. | 345/419 |
| 6,879,323 B1 * | 4/2005 | Takezawa et al. | ............. | 345/420 |
| 6,879,712 B2 * | 4/2005 | Tuncay et al. | ................. | 382/128 |
| 6,947,039 B2 * | 9/2005 | Gerritsen et al. | ............. | 345/419 |
| 6,987,531 B2 * | 1/2006 | Kamon | ....................... | 348/211.4 |
| 2002/0183608 A1 * | 12/2002 | Marmulla et al. | ............ | 600/407 |
| 2002/0198764 A1 * | 12/2002 | Schorno et al. | ................. | 705/10 |
| 2003/0122823 A1 * | 7/2003 | Howson | ........................ | 345/426 |

(Continued)

OTHER PUBLICATIONS

Pollan, A. J.; Bradley, C. P.; Hunter, P. J.; A High Order Coupled Finite Element/Boundary Element Torso Model; 1999; IEEE; pp. 309-312.*

*Primary Examiner* — Daniel Hajnik
*Assistant Examiner* — Andrew G Yang

(57) ABSTRACT

Embodiments of the invention provide systems and methods for generating combined image data representing a volumetric image of a subject and a color textured external surface of the subject. According to one embodiment, two-dimensional image data of a surface of the subject can be obtained from a two-dimensional imager. Volumetric data of the subject can be obtained from a volumetric scanner. The two-dimensional imager can have a known optical property and physical position relative to the volumetric scanner. External surface mesh data can be generated based on the volumetric data. The two-dimensional image data can be mapped to the external surface mesh data based on the known physical position of the two-dimensional imager and the volumetric scanner. Display image data including the two-dimensional image data mapped to the external surface map data combined with the volumetric data can be generated and displayed.

22 Claims, 8 Drawing Sheets

U.S. PATENT DOCUMENTS

| | | | |
|---|---|---|---|
| 2003/0123713 A1* | 7/2003 | Geng | 382/118 |
| 2003/0179308 A1* | 9/2003 | Zamorano et al. | 348/333.12 |
| 2003/0193527 A1* | 10/2003 | Pharr | 345/853 |
| 2004/0015327 A1* | 1/2004 | Sachdeva et al. | 702/167 |
| 2004/0066910 A1* | 4/2004 | De Villiers | 378/901 |
| 2004/0070582 A1* | 4/2004 | Smith et al. | 345/419 |
| 2004/0189686 A1* | 9/2004 | Tanguay et al. | 345/716 |
| 2005/0008120 A1* | 1/2005 | Ellenbogen | 378/57 |
| 2005/0031194 A1* | 2/2005 | Lee et al. | 382/154 |
| 2005/0063582 A1* | 3/2005 | Park et al. | 382/154 |
| 2005/0107679 A1* | 5/2005 | Geiger et al. | 600/407 |
| 2005/0147280 A1* | 7/2005 | Yan et al. | 382/118 |
| 2005/0180542 A1* | 8/2005 | Leue et al. | 378/57 |
| 2005/0197558 A1* | 9/2005 | Williams et al. | 600/407 |
| 2005/0213820 A1* | 9/2005 | Liu et al. | 382/190 |
| 2006/0031372 A1* | 2/2006 | Krishnan et al. | 709/207 |
| 2006/0067573 A1* | 3/2006 | Parr et al. | 382/154 |
| 2006/0104545 A1* | 5/2006 | Matsumoto | 382/302 |
| 2006/0119600 A1* | 6/2006 | Lokovic et al. | 345/426 |
| 2006/0183992 A1* | 8/2006 | Kawashima | 600/407 |
| 2007/0021669 A1* | 1/2007 | Miga et al. | 600/425 |
| 2008/0057478 A1* | 3/2008 | Choi | 433/215 |

* cited by examiner

APPARATUS FOR GENERATING VOLUMETRIC IMAGE AND MATCHING COLOR TEXTURED EXTERNAL SURFACE

CROSS-REFERENCES TO RELATED APPLICATIONS

This application is a non-provisional application of and claims the benefit of U.S. Provisional Patent Application No. 60/799,388, filed on May 11, 2006, which is herein incorporated by reference in its entirety for all purposes.

BACKGROUND OF THE INVENTION

Volumetric imaging or volume rendering provides a graphical representation of a measured three-dimensional object or subject and can be used to visualize the internal structure of the object or subject. For example, in medical imaging volumetric scanners such as Computed Axial Tomography (CAT) scanners, Magnetic Resonance Imaging (MRI) scanners, Conebeam Computed Tomography (CT) scanners, or other types of scanners can be used to produce volumetric data of a scanned object such as part of a patient's body. From this volumetric data, a volumetric image of the scanned object can be produced. The volumetric image might be a three-dimensional object representation using volumetric rendering technology such as ray tracing or surface rendering after converting the volumetric data into an iso-surface model. As used herein, "subject" is used in context to refer to that physically present object, patient, patient body part, thing, etc. that is observed, scanned, etc. by an input device such as a scanner.

Images rendered based on the volumetric data of a subject can be adjusted to present different views of the subject. For example, by changing the threshold of opacity and transparency control, the internal shape or external shape and/or structure of the subject can be visualized. In medical applications, the image threshold can be adjusted to visualize the hard tissue or soft tissue, i.e., bones or muscles and flesh. As the volumetric image is adjusted to visualize the external shape of the subject, the outcome can be very similar to that provided by a three-dimensional surface scanner. That is, when there is sufficient contrast between the external volume density and the surrounding air or other containing background material, the surface of the subject can be very clearly visualized. For example, in medical applications, the three-dimensional facial profile of the patient can be clearly created and visualized.

Even though the goal of the volumetric scan of a subject is not necessarily to visualize the external profile of a subject, the external profile may be helpful if it is shown along with the internal structure. For example, in medical applications like plastic surgery, orthodontics, oral and maxillofacial surgery, the facial profile along with the underlying skull structure can provide useful information for diagnosis or development of a treatment plan.

While the three-dimensional external profiles created in such a manner can produce precise geometric representations of the shape of the surface of the subject, the color or the texture of the subject's external surface is missing. For some applications, an optical view of the external profile is very useful. For example, in plastic surgery or orthodontics applications, the optical view of the face can produce better definition of the eyes, lips, and eyebrows. Together, the three-dimensional shape and the texture can create a virtual patient model. Such images can enhance the diagnosis, treatment plan, or patient presentation.

Some three-dimensional optical or laser surface scanners can produce three-dimensional models with the color texture, but volumetric scanners cannot reproduce the surface texture by their nature since volumetric scanners detect physical properties of the mass that makes up the subject, not the optical reflection of the surface of the subject.

In order to obtain a the surface texture and the volumetric image of the subject, a multimodal representation can be used. That is, the volumetric image produced by a volumetric scanner and the textured surface scan model produced by a surface scanner can be put together into merged data. For example, the merge of face surface optical scans and the volumetric image can produce a virtual face model that can show a photorealistic face with an internal skull structure superimposed. Such a merged model can be very effective and useful for plastic surgical applications and orthodontic applications.

One of the challenges for such multimodal image representation is the registration problem. Since two sets of data, the surface scan data and volumetric scan data, are created independently, they are in two different coordinate systems. In order to superimpose the surface scan data on the volumetric scan data accurately to produce an accurate view, the two sets of data must be registered in the same coordinates in three-dimensional space. Such image and model registration may require extra steps, such as setting up common reference datum features before scanning or producing a computational best-fit of the data after scanning. Even with the extra steps, there are sources of errors and a consistency problem. Thus, the multimodal registration from two independent scans could be time consuming and unreliable.

Integrated scanner systems have been used to resolve the multimodal registration problem. An integrated scanner system comprises a surface scanning unit, such as a laser scanner, and a volume scanning unit, such as a CT scanner, in a common structure, i.e., the sensors are mounted in the same housing. Such an integrated scanner can create both the surface scan data and the volumetric scan data at the same time. Since the surface scanner and the volumetric scanner are physically mounted in the same housing, the surface scan data and volume scan data can be consistently aligned in the same coordinate system. In such a case, there is no need for the extra steps of pre-scan datum reference setup or post-scan best fit matching.

However, such an integrated scanner system might not be commercially viable. First, the cost of the system increases since the system requires both a volume scanner and a surface scanner. Second, the size of the system could increase as the two units have different spatial requirements. Third, memory and computation demand more resources since the data comprises of volumetric scan data, surface scan data and color texture data.

Hence, there is a need for improved methods and systems for generating a volumetric image with a color textured external surface that do not require the additional expense, size, and computational resources of a surface scanner unit, do not present a need for registration of the images, and can be adapted to existing volume scanners.

BRIEF SUMMARY OF THE INVENTION

Embodiments of the invention provide systems and methods for generating a volumetric image of a subject with a color textured external surface of that subject. According to one embodiment, a method for generating combined image data representing a volumetric image of a subject and a color textured image of an external surface of the subject can comprise obtaining data representing a two-dimensional image of a surface of a subject (a "two-dimensional surface image data") from a two-dimensional imager. The two-dimensional image data can comprise, for example, a digital photograph. Volumetric data of the subject can be obtained from a volumetric scanner. The volumetric data can comprise data from a Computed Axial Tomography (CAT) scan, a Magnetic Resonance Imaging (MRI) scan, a Conebeam Computed Tomography (CT) scan, or other type of volumetric scan. The two-dimensional imager and the volumetric scanner can have a known physical positions relative to each other.

In some cases, the method can also include determining whether a field of view of the two-dimensional imager matches a field of view of the volumetric scanner. In such cases, the resulting two-dimensional surface image data and/or the volumetric data can be cropped to fit boundaries of a field of view of the two-dimensional imager if it does not match the field of view of the volumetric scanner.

External surface mesh data can be generated based on the volumetric data. The two-dimensional surface image data can be mapped to the external surface mesh data based on the known physical position of the two-dimensional imager and the volumetric scanner. Display image data including the two-dimensional surface image data mapped to the external surface map data combined with the volumetric data can be generated and displayed as a combined display image. The external surface mesh data can be stored as, for example, a list of polygons defining a piecewise planar surface.

According to another embodiment, an imaging system for generating combined image data representing a volumetric image of a subject and a color textured image of an external surface of the subject can comprise a volumetric scanner and a two-dimensional imager. The two-dimensional imager can comprise, for example, a digital camera. The volumetric scanner can comprise, for example, a Computed Axial Tomography (CAT) scanner, a Magnetic Resonance Imaging (MRI) scanner, a Conebeam Computed Tomography (CT) scanner, or other type of volumetric scanner. The two-dimensional imager and the volumetric scanner can have a known physical position relative to each other.

The system can also include a processor communicatively coupled with the volumetric scanner and the two dimensional imager. The processor can be adapted to obtain two-dimensional surface image data from the two-dimensional imager and obtain volumetric data of the subject from the volumetric scanner. In some cases, the processor can be adapted to determine whether a field of view of the two-dimensional imager matches a field of view of the volumetric scanner. In such a case, the processor can be adapted to crop the two-dimensional image data and/or the volumetric data in response to determining the field of view of the two-dimensional imager does not match the field of view of the volumetric scanner, perhaps to eliminate zones wherein one data set is represented but not the other.

The processor can also be adapted to generate external surface mesh data based on the volumetric data and map the two-dimensional surface image data to the external surface mesh data based on the known physical position of the two-dimensional imager and the volumetric scanner. The processor can be further adapted to generate a display image or display image data including the two-dimensional surface image data mapped to the external surface map data combined with the volumetric data. The system can further comprise a display device communicatively coupled with the processor. In such a case, the processor can be further adapted to display the display image data on the display device.

According to yet another embodiment, a machine-readable medium can have stored thereon a series of instruction that, when executed by a processor, cause the processor to generate combined image data representing a volumetric image of a subject and a color textured image of an external surface of the subject by obtaining a two-dimensional surface image data from a two-dimensional imager and obtaining volumetric data of the subject from a volumetric scanner wherein the two-dimensional imager and the volumetric scanner have a known physical position relative to each other. The two-dimensional image data can comprise, for example, a digital photograph. The volumetric data can comprise data from a Computed Axial Tomography (CAT) scan, a Magnetic Resonance Imaging (MRI) scan, a Conebeam Computed Tomography (CT) scan, or other type of volumetric scan.

The machine-readable medium can also have instructions for determining whether a field of view of the two-dimensional imager matches a field of view of the volumetric scanner. In such a case, the two-dimensional image data and/or the volumetric data can be cropped in response to determining the field of view of the two-dimensional imager does not match the field of view of the volumetric scanner.

The machine-readable medium can also include instructions for generating external surface mesh data based on the volumetric data. The two-dimensional surface image data can be mapped to the external surface mesh data based on the known physical position of the two-dimensional imager and the volumetric scanner. A display image including a two-dimensional image from the two-dimensional surface image data mapped to the external surface map combined with the volumetric data can be generated and displayed.

DETAILED DESCRIPTION OF THE INVENTION

Figure 1:
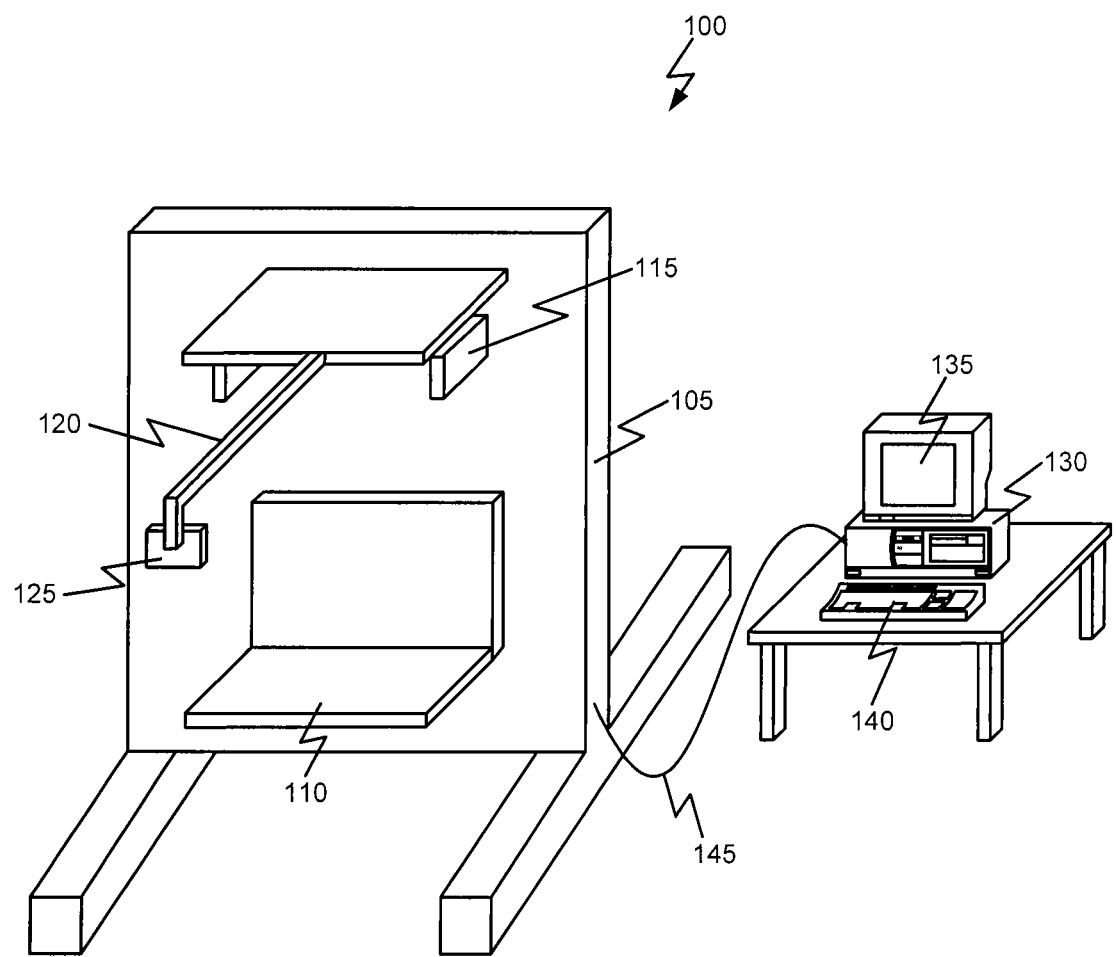
FIG. 1 illustrates a system for generating volumetric image data with a color textured external surface according to one embodiment of the present invention.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide systems and methods for generating a volumetric image with a color textured external surface. Generally speaking, generating a volumetric image with a color textured external surface can comprise obtaining two-dimensional image data representing a surface of a subject from a two-dimensional imager such as a digital camera or other two-dimensional imager. Volumetric data of the subject can be obtained from a volumetric scanner including, but not limited to, a Computed Axial Tomography (CAT) scanner, Magnetic Resonance Imaging (MRI) scanner, Cone-beam Computed Tomography (CT) scanner, or other types of volumetric scanner.

The two-dimensional imager and the volumetric scanner can have a known physical position relative to each other. That is, as will be described in detail below, the two-dimensional imager and the volumetric scanner can have a fixed or predetermined physical position relative to each other. Alternatively, the two-dimensional imager and the volumetric scanner can have a physical position relative to each other that, while not necessarily fixed or predetermined, is determinable so that a two-dimensional image data and volumetric data produced by each can be aligned or mapped to each other based on the position of the equipment without a need to register coordinates on one against those of the other. As will be seen, a display image can be generated based on the two-dimensional image data and the volumetric data. Generally speaking, the display image can include the two-dimensional image data representing the surface of the subject mapped to or overlaid on the volumetric data to produce an imaging having both the volumetric image and the color textured external surface.

Importantly, while examples described herein may reference medical and/or dental applications, it should be understood that embodiments of the present invention may also be suitable for use in different application. For example, in addition to medical and dental applications in which the subject of the imaging is a person or portions of a persons body, other uses include industrial application in which the subject is a piece of equipment, a product, or other physical object. Furthermore, it should be noted that embodiments described below with reference to the figures are offered by way of example and not limitation. Rather, numerous variations on these exemplary embodiments are contemplated and considered to be within the scope of the present invention. For example, any of a wide variety of open or closed volumetric scanners are thought to be suitable for use with various embodiments of the present invention. Similarly, any of a variety of possible two-dimensional imagers may also be used.

FIG. 1 illustrates a system for generating volumetric image data with a color textured external surface according to one embodiment of the present invention. In this example, the system 100 includes a volumetric scanner 105 such as a CAT scanner, MRI scanner, CT scanner or other type of volumetric scanner. It should be noted that, while illustrated here as an upright unit having a seat 110 upon which a patient or subject can sit upright, the volumetric scanner 105 may alternatively have a horizontal orientation with a bed or table allowing the patient or subject to lay down. Furthermore, while shown here as an "open" type of scanner with a head unit 115 that rotates about the patient or subject while allowing the patient to have a more or less open field of view, the volumetric scanner 105 may alternatively be a "closed" type which encloses or surrounds the patient or subject.

The system can also include a two-dimensional imager 125 such as a digital camera. While shown here as a single two-dimensional imager 125, in other embodiments, multiple two-dimensional imagers may be used. For example, one imager can be used to obtain a front view or image of the patient or subject while other imagers can be used to obtain side and/or back views of the patient or subject. As noted above, the two-dimensional imager 125 can have a known physical position relative to the volumetric scanner 105. In this example, the two-dimensional imager 125 is shown fixed to the volumetric scanner 105 via a support 120 extending from the head unit 115 of the volumetric scanner 105. Alternatively, other arrangement may be used to maintain a fixed position between the two-dimensional imager 125 and volumetric scanner 105. For example, a supporting structure may be used to fix the two-dimensional imager 125 to the volumetric scanner 105 in another position or location other than the head unit 115. According to another alternative and as mentioned above, rather than being fixed to the volumetric scanner 105, the two-dimensional imager 125 may be positioned in a predetermined or otherwise known location relative to the volumetric scanner 105. Such an arrangement will be described in detail below with reference to FIG. 2.

As illustrated in FIG. 1, the system 100 can also include a computer 130 or other processor communicatively coupled with the volumetric scanner 105 and the two dimensional imager 125 via a wired or wireless communication link 145. The computer 103 can be adapt to obtain two-dimensional image data representing the surface of the subject from the two-dimensional imager 125 and obtain volumetric data of the subject from the volumetric scanner 105. As will be described in detail below, display image data can be generated by the computer 130 based on the two-dimensional image data and the volumetric data. Generally speaking, the display image data can include the two-dimensional image data representing the surface of the subject mapped to or overlaid on the volumetric data to produce an image having both the volumetric image and the color textured external surface.

The system can also include a display 135 or monitor coupled with the computer 130 for displaying the display image and/or other information. The computer 130 can also be coupled with a keyboard 140 or other input device to allow a human operator to interact with the computer 130, manipulate the display image, control the volumetric scanner 105 and/or two-dimensional imager 125, or perform other operation.

In use, one or more photos or other two-dimensional images of the subject can be taken by the two-dimensional imager 125 and a volumetric scan can be taken by the volumetric scanner 105. The two-dimensional image(s) can be taken before or after the volumetric scan or at any other time while the head 115 or other structure of the volumetric scanner 105 is not blocking the two-dimensional imager's view to the subject. Therefore, the two-dimensional image data can provide the subject's external color and texture. In medical application, the two-dimensional image data can represent, for example, the patient's frontal face shot. The volumetric image data can provide the internal and external structure. For computed tomography image, the volumetric data can provide the mass density distribution in the field of view of the scanner. As will be seen, these data can be combined to produce data for an image that includes both the volumetric image and the color textured external surface image. Such an image can be displayed, for example on display 135, and manipulated by an operator of the system 100.

According to one embodiment, the two-dimensional imager can additionally act as a visual monitor to provide a live and/or continuous image. That is, while the scanner is running, a technician or operator may be outside of the scanning room to avoid unnecessary exposure to x-ray radiation. In such a case, it may be difficult to monitor the patient or instruct the patient for positioning. With the live feed of the image from the two-dimensional imager, the technician can monitor and help the patient without going into the scanning room.

Figure 2:
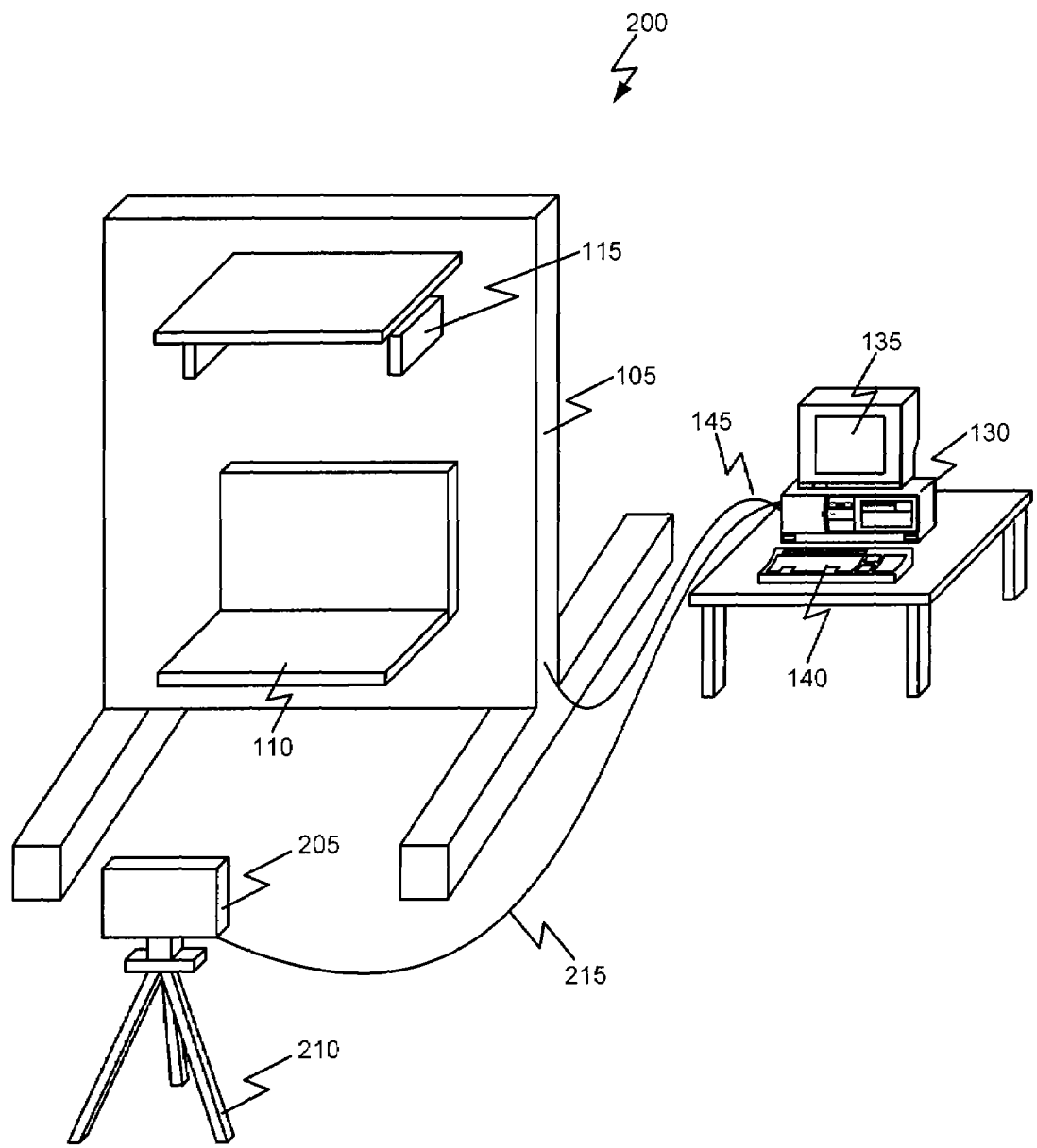
FIG. 2 illustrates a system for generating volumetric image data with color textured external surface data according to an alternative embodiment of the present invention.

As noted above, other arrangements of the system are possible and are considered to be within the scope of the present invention. For example, FIG. 2 illustrates a system for generating volumetric image with color textured external surface data according to an alternative embodiment of the present invention. Here, the system 200 includes the volumetric scanner 105 and computer 130 with display 135 and keyboard 140 as described above. However, in this example, the two-dimensional imager 205 is not mounted on or fixed to the volumetric scanner 105. Rather, the two-dimensional imager 205 is mounted on a tripod 210 or other support separate from the volumetric scanner 105. This arrangement maybe useful when refitting or modifying an existing volumetric scanner to include the ability to add color textured external surface data to volumetric data as described herein. The two-dimensional imager 205 can also be communicatively coupled with the computer 130 via a wired 215 or wireless connection.

However, as noted above, the two-dimensional imager 205 and the volumetric scanner 105 can have a physical position relative to each other that, while not necessarily fixed or predetermined, is determinable and known so that a two-dimensional image data and volumetric data produced by each can be aligned or mapped to each other based on the position of the equipment without a need to register coordinates on one against those of the other. For example, the position of the two-dimensional imager 205 and volumetric scanner 105 can be determined and/or arranged at the time the equipment is installed based, for example on a set of specifications from the equipment manufacturer, from actual measurements of the physical equipment, and/or by other means or procedures. Furthermore, while only one two-dimensional imager 205 is shown here, as noted above, more than one imager may be used to provide multiple views of the subject. For example, one imager may be used to provide a front view while others are used to provide side views.

In operation, the system 200 can function as described above. That is, one or more photos or other two-dimensional image data representing the subject can be taken by the two-dimensional imager 205 and a volumetric scan can be taken by the volumetric scanner 105. The two-dimensional data can be taken before or after the volumetric scan or at any other time while the head 115 or other structure of the volumetric scanner 105 is not blocking the two-dimensional imager's 205 view to the subject. These data can be combined to produce image data that includes both the volumetric image data and the color textured external surface. An image based on this combined data can be displayed, for example on display 135, and manipulated by an operator of the system 200.

Figure 3:
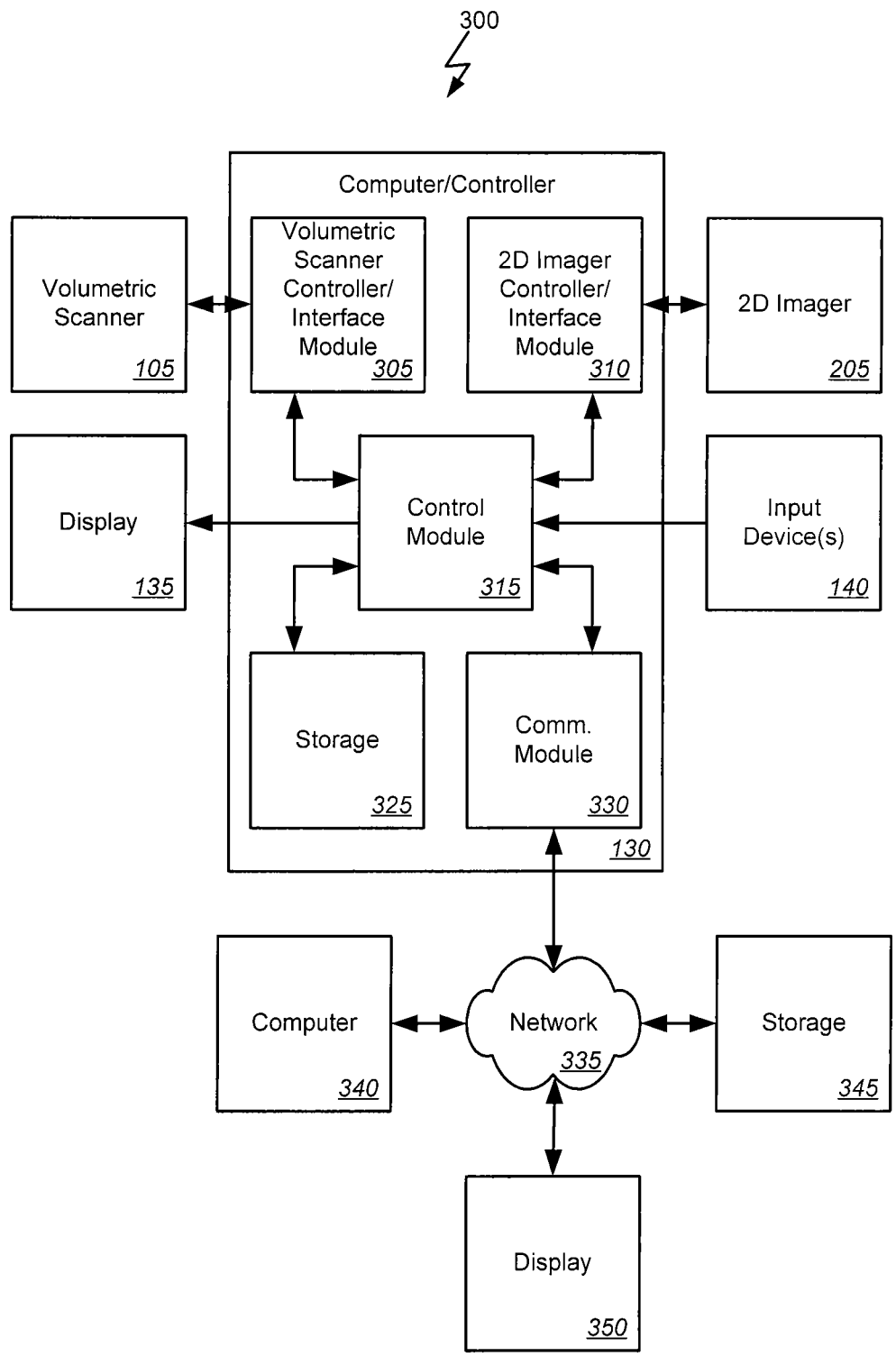
FIG. 3 is a block diagram illustrating functional components of a system for a system for generating volumetric image data with color textured external surface data according to one embodiment of the present invention.

FIG. 3 is a block diagram illustrating functional components of a system for a system for generating volumetric image data with color textured external surface data according to one embodiment of the present invention. In this example, the system includes the volumetric scanner 105, two-dimensional imager 205, display 135, keyboard or other input devices 140 and computer 130 as described above. The computer 130 may be any of a variety of general purpose computers including, merely by way of example, personal computers and/or laptop computers running various versions of Microsoft Corporation's Windows™ operating system, Apple Corporation's operating systems, any of a variety of commercially-available UNIX or UNIX-like operating systems (including without limitation, the variety of GNU/Linux operating systems), etc.

The computer 130 may also include one or more storage device 325. By way of example, storage device(s) 325 may be disk drives, optical storage devices, solid-state storage device such as a random access memory ("RAM") and/or a read-only memory ("ROM"), which can be programmable, flash-updateable and/or the like. The computer system 130 may also comprise storage that includes software elements such as an operating system and/or other code 350, such as an application program. The application programs may implement components of an imaging system, and/or the methods of the invention as described herein. It should be appreciated that alternate embodiments of a computer system 130 may have numerous variations from that described above. For example, customized hardware might also be used and/or particular elements might be implemented in hardware, software (including portable software, such as applets), or both.

Whether implemented in software or customized hardware, the computer system 130 can include components for implementing the various features and functions described above. For example, the computer 130 can include a volumetric scanner controller and/or interface module 305 for communicating with the volumetric scanner 105 and obtaining volumetric data. Similarly, the computer 130 can include a two-dimensional image controller and/or interface module 310 for communicating with the two-dimensional imager 205 and obtaining two-dimensional image data.

Additionally, the computer 130 can include a control module 315 for interfacing with and/or controlling the other modules 305-330 of the computer system 130. Additionally or alternatively, the control module 315 or other module can interface with the input devices 140 such as a scan device, a mouse, a keyboard, etc. as well as the display 135 or other output device such as a printer, plotter, etc.

The computer 130 can also include a communication module to permit data to be exchanged with a network 335 and/or any other computer or other type of device. The network 335 may can be any type of network familiar to those skilled in the art that can support data communications using any of a variety of commercially-available protocols, including without limitation TCP/IP, SNA, IPX, AppleTalk, and the like. Merely by way of example, the network 335 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

Via the network 335, the computer 130 can communicate with one or more other computer systems 340 to, for example, provide image data of the subject, provide for control and/or remote operation of the imaging system 300, etc. The computer 130 may also access, via the network 335, mass storage 345 for storing and/or retrieving images. Additionally or alternatively, the computer system may send images via the network 335 to one or more displays.

Figure 4:
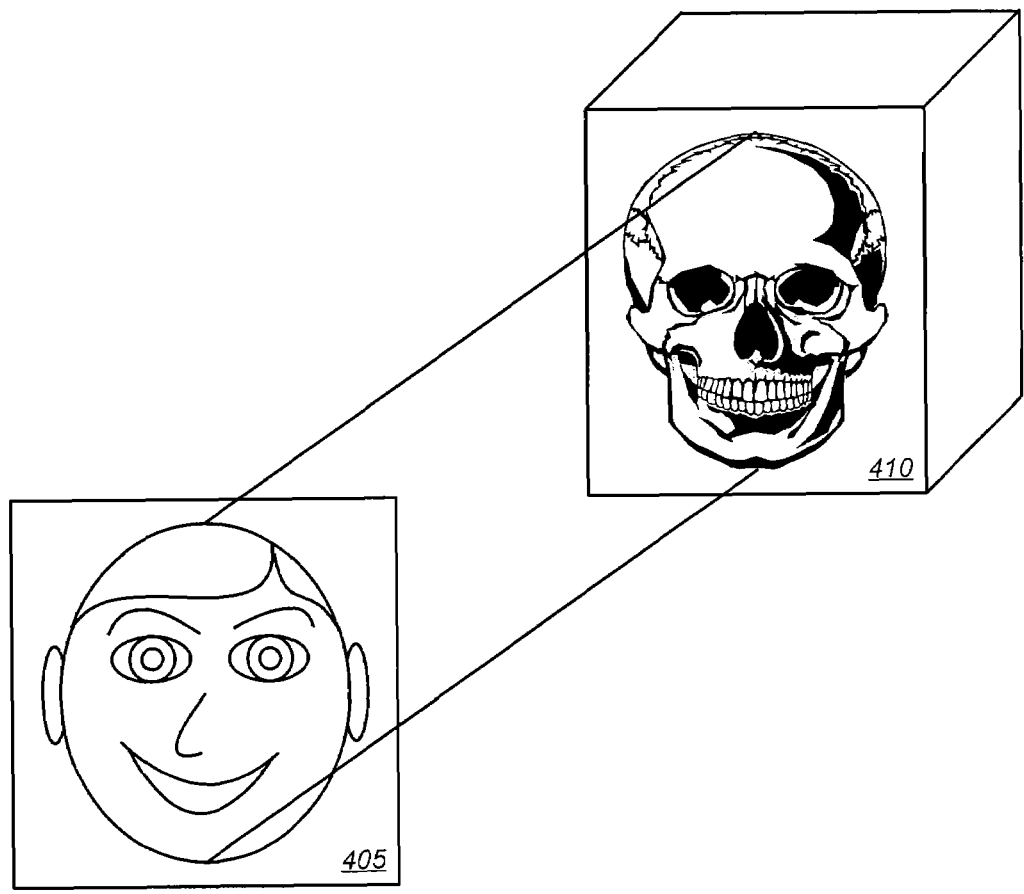
FIG. 4 illustrates generating volumetric image data with color textured external surface according to one embodiment of the present invention.

As introduced above, the computer system 130 can generate a display image data based on the two-dimensional image data obtained from one or more two-dimensional imagers 205 and the volumetric data obtained from the volumetric scanner 105. The display image data can include the two-dimensional image data representing the surface of the subject mapped to or overlaid on the volumetric data to produce image data having both the volumetric image data and the color textured external surface data. FIG. 4 conceptually illustrates generating volumetric image data with color textured external surface data according to one embodiment of the present invention.

As shown in FIG. 4, a photo or other two-dimensional image data 405 is taken, for example, right before the volumetric scan or after the scan while the scanners structure is not blocking the two-dimensional imager's view to the subject. Volumetric image data (voxel data) 410 can also be obtained from the volumetric scanner. As noted, the photographic, two-dimensional image data 405 holds the subject's external color and texture. In medical applications, the two-dimensional image data 405 can represent, for example, the patient's frontal face shot. The volumetric image data 410 contains the internal and external structure. For a computed tomography image, the volumetric image data 410 can contain the mass density distribution in the field of view. The two-dimensional image data 405 can be used to provide a color textured external surface data to the volumetric data 410 to produce a display image data having both the volumetric data and the external color textured surface data.

As an intermediate process, the two-dimensional image data 405 can be mapped to a three-dimensional space or coordinate system. According to one embodiment, this can be achieved by first generating external surface mesh data based on the volumetric data 410. The two-dimensional image data 405 can then be mapped to the external surface mesh data to, in effect, convert or translate the two-dimensional image data from a two-dimensional coordinate system to a three-dimensional coordinate system that corresponds to that of the volumetric data. Furthermore, since the two-dimensional imager and the volumetric imager have known physical positions relative to each other, there is no need to register the coordinate system of the two-dimensional image data to that of the volumetric data. Rather, mapping the two-dimensional image data to the external surface mesh data, and the volumetric data from which it was generated, can be based on the known physical position of the two-dimensional imager and the volumetric scanner.

Figure 5:
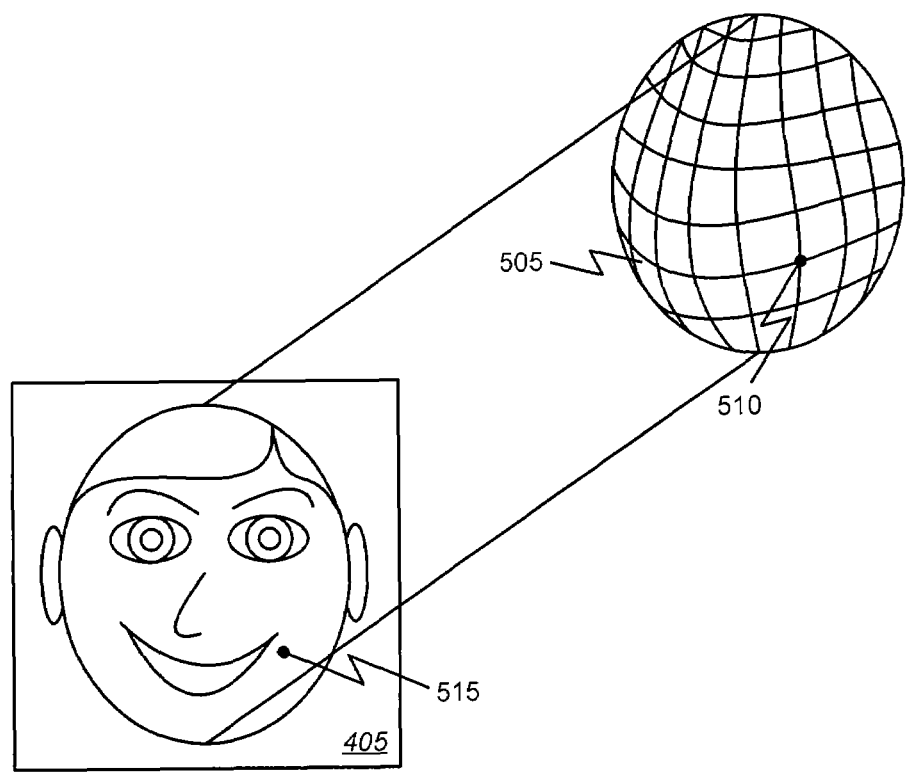
FIG. 5 further illustrates generating volumetric image data with color textured external surface data according to one embodiment of the present invention.

FIG. 5 further illustrates generating volumetric image data with color textured external surface data according to one embodiment of the present invention. This example illustrates the two-dimensional image data 405 described above and external surface mesh data 505 generated from the volumetric data. Generally speaking, coordinates 510 on the external surface mesh data 505 have unique, matching coordinates 515 on the two-dimensional image data 405. Using the two dimensional image data 405 as a texture map and the matching texture coordinates 515 from 510, the color image can be mapped on the three-dimensional surface mesh data.

More specifically, after the volume data is obtained, the external surface mesh data 505 can be created, for example, by an iso-surface generation method or volume wrapping method from the volumetric data. The surface mesh data 505 represents the external boundary between the air and subject. Thus, the surface mesh data 505 represents the three-dimensional geometric shape of the subject. For example, in medical applications the surface mesh data 505 can represent the patient's facial profile.

Since the two-dimensional imager's optical property and position with respect to the volumetric scanner is predefined or known, positions in the coordinate system of the two-dimensional image data 405 can be transformed to three-dimensional coordinates of the volumetric data. If the two-dimensional image data 405 covers the entire volumetric scanner's field of view, a three-dimensional position in the surface mesh data 505, and thus the surface of the volumetric data from which the surface mesh data is generated, can have the corresponding, matching two-dimensional point in the two-dimensional image data 405. As shown in FIG. 5, a point 510 defined in the three-dimensional coordinate system (e.g., x,y,z) of the surface mesh data 505, and thus the volumetric data coordinate system as well, can have a corresponding two-dimensional point 515 defined in the two-dimensional coordinate system (e.g., u,v) of the two-dimensional image data 405. Similarly, other points in the surface mesh data 505 have corresponding coordinates in the two-dimensional image data 405. Using this coordinate mapping, the texture map of the surface mesh data 505 can be constructed.

According to one embodiment, prior to mapping the two-dimensional image to the surface mesh, a determination can be made as to whether the field of view of the two-dimensional imager matches the field of view of the volumetric scanner. If necessary, i.e., the field of view does not match, then some part of surface mesh data can be trimmed off and deleted or cropped. Alternatively or additionally, portions of the two-dimensional image data can be cropped. In yet another case, the volumetric data can additionally or alternatively be cropped, for example, prior to generation of the surface mesh data.

Regardless of which image or data is cropped, the boundaries of the two-dimensional image data and the boundaries of the surface mesh data can be made to match. The cropping can be based, for example, on known limits or outside boundaries of the field of view of either the two-dimensional imager or the volumetric scanner. Points in the coordinate system of the two-dimensional image data, the volumetric data, and/or the surface mesh data can the be deleted to match the limits of the others.

According to one embodiment, a part of the surface of the subject that is not visible from the two-dimensional imager's viewpoint can be deleted. For example, in a medical application where one two-dimensional imager is used to capture an image of the patient's face, the backside of patient head can be deleted from the surface mesh data. In another example, if the surface mesh is created by an iso-surface method, internal structures including airways etc that may be represented in the surface mesh data but are not actually an external surface can be deleted.

So, for example in a medical application, the facial profile can be created from the volumetric scan and the frontal photo of the patient face or other two-dimensional image can created by the camera unit or other two-dimensional imager. Each vertex of the facial profile mesh can have a corresponding point in the frontal photo. As the color texture is created on the mesh, detailed eye, lip, eye brows and skin tone can be created on the facial profile creating the virtual three-dimensional patient model.

In this way, the color textured mesh model is in the same coordinates of the volumetric image data. Thus, the internal structure and the external photo realistic profile can be visualized, measured, and manipulated at the same time. That is, a display image can be created by overlaying or otherwise combining the color textured mesh model and the volumetric data. So, for example in a medical application, the photo realistic facial model and the internal skull, dentition, brain, or airway structure can be represented at the same time in the same data.

Figure 6:
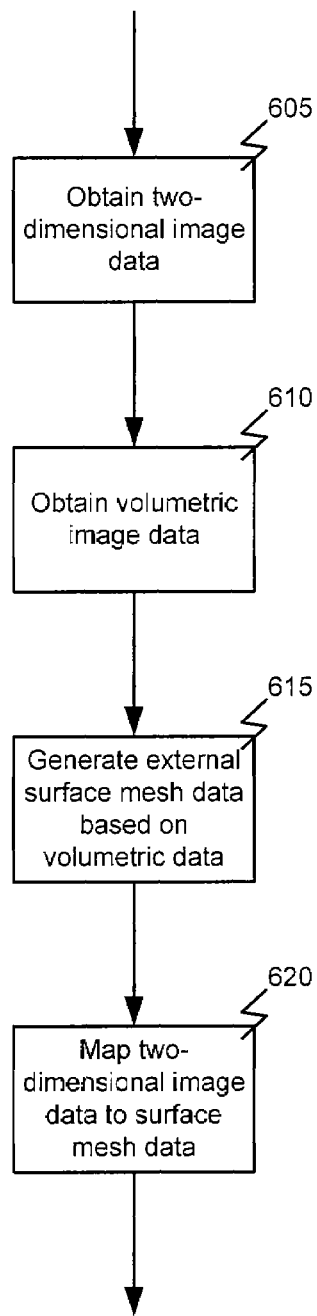
FIG. 6 illustrates a process for generating volumetric image data with color textured external surface data according to one embodiment of the present invention.

FIG. 6 illustrates a process for generating volumetric image data with color textured external surface data according to one embodiment of the present invention. In this example, processing begins with obtaining 605 two-dimensional image data representing a surface of a subject from a two-dimensional imager. For example, a photograph can be taken of the subject by a digital camera. Similarly, volumetric data of the subject can be obtained 610 from a volumetric scanner. For example, a CAT scan, MRI scan, CT scan, or other volumetric scan can be taken. As described in detail above, the two-dimensional imager and the volumetric scanner can have a known physical position relative to each other.

External surface mesh data can be generated 615 based on the volumetric data. That is, after the volumetric data is obtained 610, external surface mesh data can be created 615, for example, by an iso-surface generation method or volume wrapping method from the volumetric data. The surface mesh data can represent the external boundary between the air and subject. Thus, the surface mesh data represents the three-dimensional geometric shape of the subject. For example, in medical applications the surface mesh data can represent the patient's facial profile.

The two-dimensional image data representing the surface of the subject can be mapped 620 to the external surface mesh data based on the known physical position of the two-dimensional imager and the volumetric scanner. That is, as described above, a point defined in the three-dimensional coordinate system (e.g., x,y,z) of the surface mesh data, and thus the volumetric data coordinate system from which the surface mesh was generated, can have a corresponding two-dimensional point defined in the two-dimensional coordinate system (e.g., u,v) of the two-dimensional image data. Similarly, other points on the surface mesh data have corresponding coordinates in the two-dimensional image data. By mapping the two-dimensional image data of the surface of the subject to the external surface mesh data, the texture map of the surface mesh data, and thus the volumetric data from which the surface mesh data was created, can be constructed.

Figure 7:
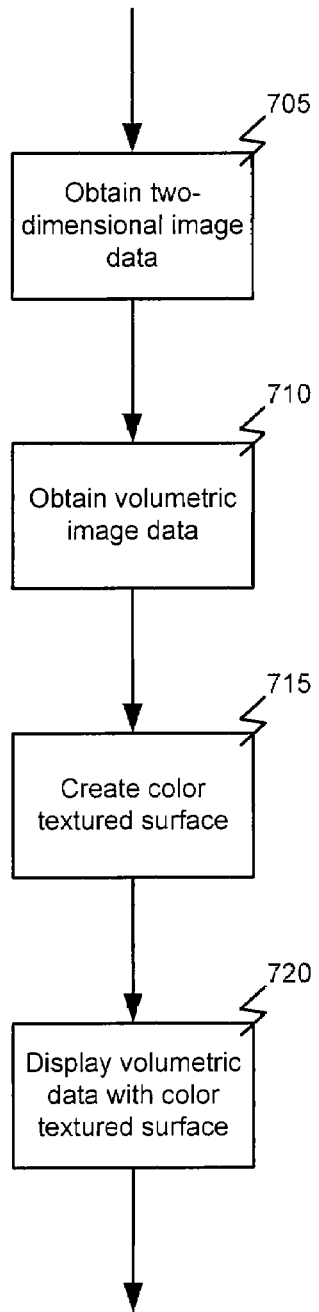
FIG. 7 illustrates a process for generating volumetric image data with color textured external surface data according to an alternative embodiment of the present invention.

FIG. 7 illustrates a process for generating volumetric image data with color textured external surface data according to an alternative embodiment of the present invention. Here, as in the previous example, processing begins with obtaining 705 two-dimensional image data representing a surface of a subject from a two-dimensional imager. For example, a photograph can be taken of the subject by a digital camera. Similarly, volumetric data of the subject can be obtained 710 from a volumetric scanner. For example, a CAT scan, MRI scan, CT scan, or other volumetric scan can be taken. As described in detail above, the two-dimensional imager and the volumetric scanner can have a known physical position relative to each other.

As illustrated in FIG. 7, a color textured surface for the volumetric data can be created 715 based on the two-dimensional image. That is, rather than generating external surface mesh data and mapping the two-dimensional image data to the surface mesh as described above with reference to FIG. 7, a color textured surface visualization can be created 715 without creating the surface mesh data. For example, a ray casting volume rendering can create a visualization similar to a shaded surface without creating any polygonal surface mesh. The color texture can be added directed on the ray casting rendering.

According to one embodiment, a volume rendering, i.e., image data based on the volumetric data, can be set to visualize the external profile of the subject. For example, the opacity threshold level can be set to show the external soft tissue profile or other external surface of the subject. Since the two-dimensional image data and the three-dimensional volume data have a pre-defined coordinate matching, a voxel in the volume data has a corresponding texture image color value in the two-dimensional image data. Ray casting volume rendering can comprise extending an array ray from a view point of the two-dimensional image until the ray hits a voxel of the volumetric data that is higher than a threshold value, i.e., until the ray encounters the surface of the subject.

As the ray reaches the external profile voxel of the volumetric data, the visualization illumination of the voxel can be calculated by several factors including the density accumulation of the ray, the surface normal and lighting condition at the voxel, and the preset color map. Ray casting for volume rendering can use a preset color map from voxel gray scale. According to one embodiment, the color map comes from the two-dimensional image, i.e. photographic image, data. Since the coordinate matching between a voxel and the two-dimensional image is known, the color value for the voxel can be determined from the two-dimensional image. Combining the ray casting, shading factor and the color value, the final rendering illumination and color value for the volumetric data can be determined. Then, the three-dimensional volume rendering of the volumetric data can be displayed 720 to show the texture mapping on the external surface. So, given an opacity threshold that visualizes the external surface profile, a ray casting technique can create a three-dimensional rendering of the volume data with the color textured external profile without generating the surface mesh.

Figure 8:
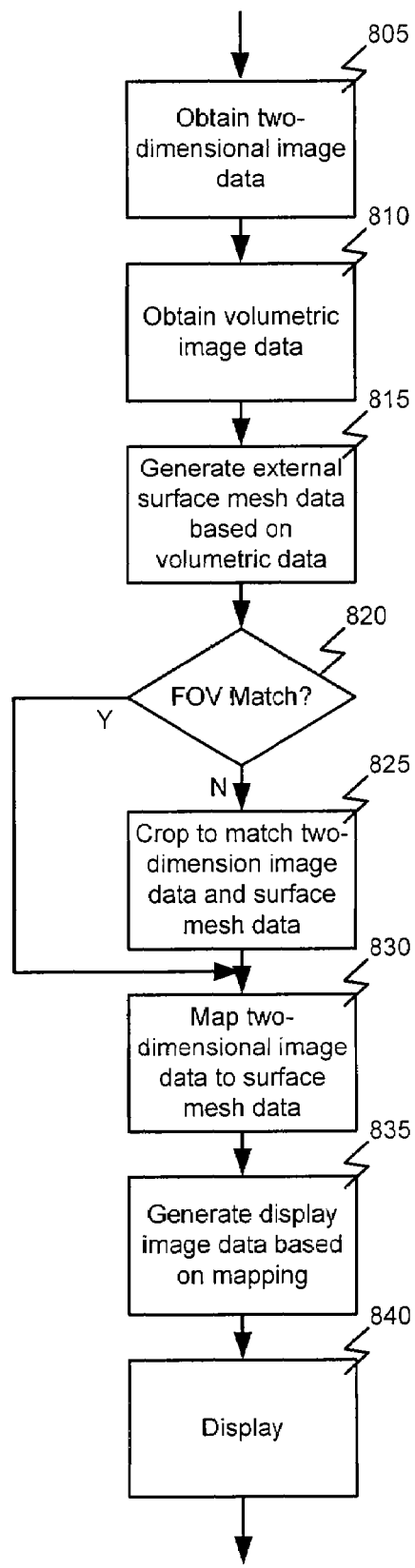
FIG. 8 illustrates further details of a process for generating volumetric image data with color textured external surface data according to one embodiment of the present invention.

FIG. 8 illustrates further details of a process for generating volumetric image data with color textured external surface data according to one embodiment of the present invention. As in the previous example, processing here begins with obtaining 805 two-dimensional image data representing a surface of a subject from a two-dimensional imager. For example, a photograph can be taken of the subject by a digital camera. Similarly, volumetric data of the subject can be obtained 810 from a volumetric scanner. For example, a CAT scan, MRI scan, CT scan, or other volumetric scan can be taken. As described in detail above, the two-dimensional imager and the volumetric scanner can have a known physical position relative to each other.

External surface mesh can be generated 815 based on the volumetric data. That is, after the volumetric data is obtained 810, external surface mesh data can be created 815, for example, by an iso-surface generation method or volume wrapping method from the volumetric data. The surface mesh data can represent the external boundary between the air and subject. Thus, the surface mesh data represents the three-dimensional geometric shape of the subject. For example, in medical applications the surface mesh data can represent the patient's facial profile.

A determination 820 can be made as to whether a field of view of the two-dimensional imager matches a field of view of the volumetric scanner. This determination 820 can be based, for example, on known limits or outside boundaries of the field of view of either the two-dimensional imager or the volumetric scanner. If a determination 820 is made that the field of view does not match, then some part of surface mesh data, the two-dimensional image data, and/or the volumetric data can be trimmed off and deleted or cropped 825. That is, points in the coordinate system of the two-dimensional image data, the volumetric data, and/or the surface mesh data can the be deleted to match the limits of the others.

The two-dimensional image data representing the surface of the subject can be mapped 830 to the external surface mesh data based on the known physical position of the two-dimensional imager and the volumetric scanner. That is, as described above, a point defined in the three-dimensional coordinate system (e.g., x,y,z) of the surface mesh data, and thus the volumetric data coordinate system from which the surface mesh data was generated, can have a corresponding two-dimensional point defined in the two-dimensional coordinate system (e.g., u,v) of the two-dimensional image data. Similarly, other points on the surface mesh data have corresponding coordinates in the two-dimensional image data. By mapping the two-dimensional image data to the external surface mesh data, the texture map of the surface mesh data, and thus the volumetric data from which the surface mesh was created, can be constructed.

A display image can be generated 835. The display image can include the two-dimensional image data representing the surface of the subject mapped to the external surface map data combined with the volumetric data. That is, the color texture map of the surface mesh data, and thus the volumetric data from which the surface mesh data was created, can be overlaid or otherwise combined with the volumetric data to create display image data. So, for example in a medical application, the photo realistic facial model and the internal skull, dentition, brain, or airway structure can be represented at the same time in the same data. The display image data can then be displayed 840, such as on a video display or monitor.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
obtaining two-dimensional image data of a surface of a subject using a two-dimensional imager;
obtaining volumetric data representing both an internal and external structure of the subject using a volumetric scanner, wherein the volumetric scanner is separate from the two-dimensional imager, wherein the two-dimensional imager is placed at a user-adjustable physical position relative to the volumetric scanner;
registering the coordinate of the volumetric data with the coordinate of the two-dimensional image data based on the user-adjustable physical position of the two-dimensional imager relative to the volumetric scanner;
setting an opacity threshold of the volumetric data to render an external surface of the subject;
extending an array ray from a view point of the two-dimensional image data until the array ray encounters the external surface of the subject that has an opacity level higher than the opacity threshold;
mapping the two-dimensional image data to the external surface of the volumetric data based on the extended array ray;
generating display image data comprising the two-dimensional image data and the volumetric data; and
visualizing the external surface of the volumetric data of the subject combined with color texture of the two-dimensional image data without generating external surface mesh data.

2. The method of claim 1, further comprising calculating illumination of the external surface based on one or more of a group comprising density accumulation of the array ray, surface normal of the external surface, lighting condition, and a preset color map.

3. The method of claim 1, further comprising determining whether a field of view of the two-dimensional imager matches a field of view of the volumetric scanner.

4. The method of claim 3, further comprising cropping the two-dimensional image data in response to determining the field of view of the two-dimensional imager does not match the field of view of the volumetric scanner.

5. The method of claim 3, further comprising cropping the volumetric data in response to determining the field of view of the two-dimensional imager does not match the field of view of the volumetric scanner.

6. The method of claim 1, wherein the live image of the subject is used by an operator of the volumetric scanner for monitoring or instructing the subject.

7. An imaging system for generating combined image data representing a volumetric image of a subject and a color textured image of an external surface of the subject, the system comprising:
a volumetric scanner selected from a group comprising a Computed Axial Tomography (CAT) scanner, a Magnetic Resonance Imaging (MRI) scanner, and a Computed Tomography (CT) scanner;
a two-dimensional imager, wherein the two-dimensional imager is separate from the volumetric scanner and placed at a user-adjustable physical position relative to the volumetric scanner;
a processor communicatively coupled with the volumetric scanner and the two: dimensional imager, the processor adapted to:
obtain two-dimensional image data of the surface of a subject from the two-dimensional imager;
obtain volumetric data representing both an internal and external structure of the subject from the volumetric scanner;
register the coordinate of the volumetric data with the coordinate of the two-dimensional image data based on the user-adjustable physical position relative to the volumetric scanner;
set an opacity threshold of the volumetric data to render an external surface of the subject;
extend an array ray from a view point of the two-dimensional image data until the array ray encounters the external surface of the subject that has an opacity level higher than the opacity threshold;
map the two-dimensional image data to the external surface of the volumetric data based on the extended array ray;
generate display image data comprising the two-dimensional image data and the volumetric data; and
visualize the external surface of the volumetric data of the subject combined with color texture of the two-dimensional image data without generating external surface mesh data.

8. The system of claim 7, wherein the mapping of the two-dimensional image data is mapped to the external surface of the volumetric data is further based on optical property of the two-dimensional imager with respect to the volumetric scanner.

9. The system of claim 7, further comprising a display device communicatively coupled with the processor and wherein the processor is further adapted to display the display image data on the display device.

10. The system of claim 7, wherein the processor is further adapted to determine whether a field of view of the two-dimensional imager matches a field of view of the volumetric scanner.

11. The system of claim 10, wherein the processor is further adapted to crop the two-dimensional image data in response to determining the field of view of the two-dimensional imager does not match the field of view of the volumetric scanner.

12. The system of claim 10, wherein the processor is further adapted to crop the volumetric data in response to determining the field of view of the two-dimensional imager does not match the field of view of the volumetric scanner.

13. The system of claim 7, wherein the two-dimensional imager comprises a digital camera.

14. A non-transitory machine-readable medium having stored thereon a series of instructions that, when executed by a processor, cause the processor to generate combined image data representing a volumetric image of a subject and a color textured image of an external surface of the subject by:
  obtaining two-dimensional image data of a surface of the subject using a two-dimensional imager;
  obtaining volumetric data representing both an internal and external structure of the subject using a volumetric scanner, wherein the volumetric scanner is separate from the two-dimensional imager and the two-dimensional imager is placed at a user-adjustable physical position relative to the volumetric scanner;
  registering the coordinate of the volumetric data with the coordinate of the two-dimensional image data based on the user-adjustable physical position of the two-dimensional imager relative to the volumetric scanner;
  setting an opacity threshold of the volumetric data to render an external surface of the subject;
  extending an array ray from a view point of the two-dimensional image data until the array ray encounters the external surface of the subject that has an opacity level higher than the opacity threshold;
  mapping the two-dimensional image data to the external surface of the volumetric data based on the extended array ray;
  generating display image data comprising the two-dimensional image data and the volumetric data; and
  visualizing the external surface of the volumetric data of the subject combined with color texture of the two-dimensional image data without generating external surface mesh data.

15. The non-transitory machine-readable medium of claim 14, further comprising instruction to calculate illumination of the external surface based on one or more of a group comprising density accumulation of the array ray, surface normal of the external surface, lighting condition, and a preset color map.

16. The non-transitory machine-readable medium of claim 14, further comprising instruction to determine whether a field of view of the two-dimensional imager matches a field of view of the volumetric scanner.

17. The non-transitory machine-readable medium of claim 16, further comprising instruction to crop the two-dimensional image data in response to determining the field of view of the two-dimensional imager does not match the field of view of the volumetric scanner.

18. The non-transitory machine-readable medium of claim 16, further comprising instruction to crop the volumetric data in response to determining the field of view of the two-dimensional imager does not match the field of view of the volumetric scanner.

19. The non-transitory machine-readable medium of claim 14, wherein the live image of the subject is used by an operator of the volumetric scanner for monitoring or instructing the subject.

20. The non-transitory machine-readable medium of claim 14, wherein the volumetric data comprises data from a Computed Axial Tomography (CAT) scan.

21. The non-transitory machine-readable medium of claim 14, wherein the volumetric data comprises data from a Magnetic Resonance imaging (MRI) scan.

22. The non-transitory machine-readable medium of claim 14, wherein the volumetric data comprises data from a Cone-beam Computed Tomography (CT) scan.

* * * * *